Nov. 14, 1961

C. W. RHODES 3,009,094

CURRENT CONTROL CIRCUIT

Filed April 20, 1959

INVENTOR.
CHARLES W. RHODES
BY
BUCKHORN CHEATHAM & BLORE

ATTORNEYS

Nov. 14, 1961

C. W. RHODES 3,009,094

CURRENT CONTROL CIRCUIT

Filed April 20, 1959

INVENTOR.
CHARLES W. RHODES
BY
BUCKHORN, CHEATHAM & BLORE

ATTORNEYS 3,009,094
CURRENT CONTROL CIRCUIT
Charles W. Rhodes, Portland, Oreg., assignor to Tektronix, Inc., Portland, Oreg., a corporation of Oregon
Filed Apr. 20, 1959, Ser. No. 807,352
12 Claims. (Cl. 323—66)

This invention relates to a current control circuit and more particularly to a system by which a current in a controlled circuit may be varied between predetermined limits by a first current control device and for any given setting of such current control device, the value of such current can also be changed by any desired multiplying factor or factors by a second current control device, such current remaining substantially constant for any given setting of such control devices.

In electronic devices it is frequently desirable to provide an electric current which is adjustable in value throughout wide ranges but which remains constant for any given adjustment. For example, sweep circuits for oscilloscopes frequently involve charging a capacitor with a constant current so that the voltage across such capacitor increases linearly with time. Such charging rate desirably is continuously variable and also it is desirable to vary the charging current by a definite multiplying factor or selectively by a plurality of such factors for any setting of a continuously variable adjusting device for the current. Also by accurately controlling the current flowing through a known impedance, it is possible to provide an output voltage which is variable in steps and variable continuously between such steps and which remains substantially constant even under varying loads for any given setting of the current control device.

In accordance with the present invention, a simple circuit is provided which enables the current flowing through a controlled circuit to be varied in a continuous manner and also varied in major steps which change the current in the controlled circuit by a definite multiplying factor or factors. An adjustable impedance is employed to provide such continuous varying of the current and a plurality of similar impedance branches having different values of impedance are connected so as to each carry a definite fraction of the current flowing through the adjustable impedance. Such impedance branches are selectively connected to the controlled circuit to supply the current flowing in the controlled circuit so as to vary the current in the controlled circuit in such major steps. The circuit is such that changing the impedance branch which supplies the current to the controlled circuit does not change the current in any of the impedance branches for a given setting of the adjustable impedance and also such that adjustment of the adjustable impedance changes the current proportionally in all of the impedance branches. This is accomplished by connecting one end of each of the impedance branches to one end of the adjustable impedance and maintaining the voltage between the other end of the adjustable impedance and the other end of each impedance branch at a constant value irrespective of whether such impedance branch is supplying current to the controlled circuit.

It is therefore an object of the invention to provide an improved current control circuit by which the current in a controlled circuit can be varied in steps each changing the current in the controlled circuit by a definite multiplying factor and can also be varied continuously between such steps.

Another object of the invention is to provide a current control circuit which enables the current in a controlled circuit to be varied continuously between predetermined limits and which also enables any value of current thus predetermined to be changed in steps such that the current after such change bears a predetermined ratio to the current before such change.

A further object of the invention is to provide an improved circuit for charging a capacitor in which such capacitor is charged at a rate which is constant for any given setting of a current control circuit and in which the charging current can be adjusted in a continuous manner or in steps in which the current after a given step is equal to the current before such step multiplied by a predetermined factor.

A still further object of the invention is to provide an improved regulated variable voltage supply in which the output voltage is controlled by varying the current flow through a known impedance either continuously or in steps.

Other objects and advantages of the invention will appear in the following description of preferred embodiments thereof shown in the attached drawings of which:

Figure 1:
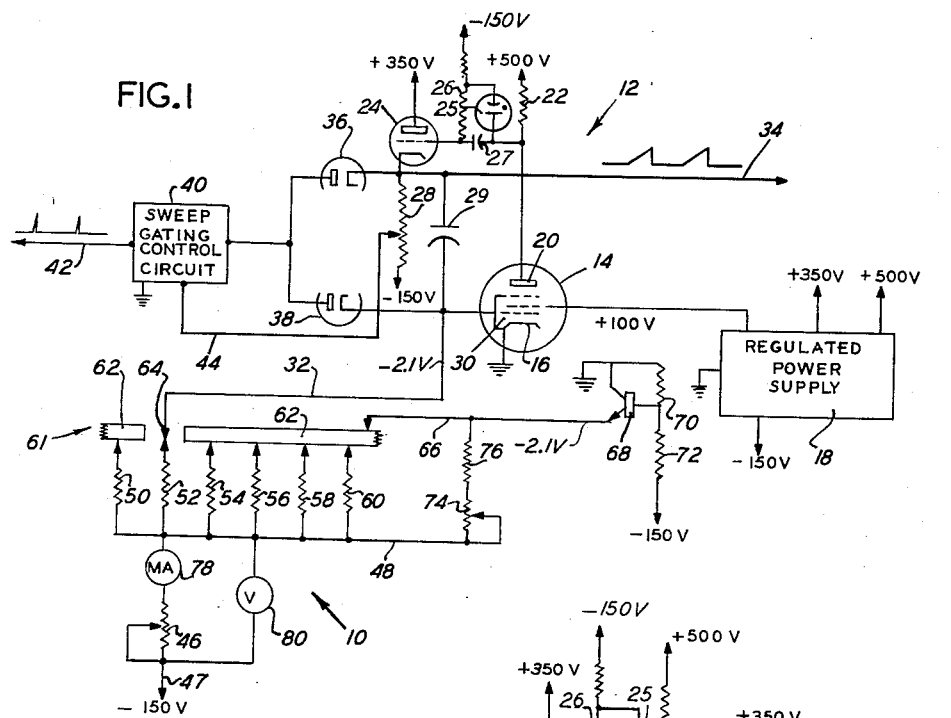
FIG. 1 is a schematic diagram showing a current control circuit in accordance with the present invention employed to charge a capacitor.

Referring more particularly to the drawings, FIG. 1 shows a current control circuit in accordance with the present invention. Such control circuit is indicated generally at 10 and is shown in conjunction with a linear sweep voltage generator indicated generally at 12. A portion of the sweep voltage generator constitutes a controlled circuit for which the current control circuit of the present invention controls the current. The sweep generator circuit will first be described and includes an integrator tube 14 which may be of the pentode type having its suppressor connected to its cathode 16, its screen grid connected to a suitable source of positive potential from the regulated power supply 18 and having its plate 20 connected to a source of higher positive potential from such source through a load resistor 22. The plate 20 of the tube 14 is connected to the control grid of a cathode follower tube 24 through a gas filled diode 25 and resistor 26. The junction of the resistor 26 and diode 25 is connected to a source of negative potential through a load resistor and the plate 20 of the integrator tube 14 is directly connected to the grid of the tube 24 through a capacitor 27. The voltage across the tube 25 remains constant and causes the grid of the tube 24 to follow any variations of potential of the plate 20 of the tube 14 at a lower potential. The tube 24 has its plate connected to a source of positive potential and its cathode connected to a source of negative potential through a cathode load resistor 28.

An integrator capacitor 29 is connected between the cathode of the cathode follower tube 24 and the control grid 30 of the integrator tube 14. Such capacitor 29 in conjunction with the cathode follower tube 24 provides a substantially 100% negative feedback path for applying changes of potential of the plate 20 to the control grid 30. That is to say, the voltage difference between the plate 20 and the grid 30 for a given charge on the capacitor is constant and such voltage difference is entirely determined by the charge on the capacitor 29. In the circuit shown, the only way of changing the charge on the capacitor 29, when the circuit is rendered operative to produce a sweep voltage pulse, is by current flow from the control circuit 10 by way of the conductor 32. Because of the substantially 100% dynamic negative feedback through the capacitor 29, the potential of the grid 30 cannot vary from a constant value more than a small fraction of a volt because of the high amplification factor of the pentode tube. Any voltage change on the plate 20 is therefore directly proportional to the rate of charging of the capacitor 29 and if the current from the current control circuit is held constant, a linear sweep voltage will be produced at the cathode of the cathode follower tube 24. Such sweep voltage can, for example, be supplied to a deflection plate of a cathode ray tube (not shown) through the conductor 34.

The diodes 36 and 38 are gating diodes connected to the cathode of the cathode follower tube 24 and to the control grid 30 of the integrator tube 14, respectively. When the sweep circuit is not operating to produce a sweep voltage pulse, the gating control circuit 40 normally holds the plates of the gating diodes 36 and 38 at substantially zero potential and under these conditions the diode 38 becomes conducting. The capacitor 29 can discharge through such diode and current from the control circuit 10 can flow through such diode. Under these conditions, the control grid 30 of the tube 14 is maintained at a small negative potential with respect to ground. For example, the grid potential may be minus 2.1 volts negative. This bias potential upon the grid 30 of the tube 14 provides sufficient electron flow in the plate circuit of the tube 14 to drive the plate 20 of the tube 14 sufficiently in a negative direction to cause the cathode of the cathode follower tube 24 to become slightly negative and thus render the diode 36 conducting. This provides a direct current 100% negative feedback path through the cathode follower tube 24 and the diodes 36 and 38 between the plate 20 of the tube 14 and the control grid 30 thereof. The result is that the plate 20 assumes a definite small positive potential which remains constant as long as the diodes 36 and 38 remain conducting.

The gating control circuit 40 may contain a bistable multivibrator (not shown), as is well known in the art, which is triggered by gating pulses supplied through the conductor 42 to drive the plates of the diodes 36 and 38 in a negative direction to cut off such diodes and disconnect any direct current path between the cathode of the cathode follower tube 24 and the control grid 30 of the integrator tube 14. The diodes 36 and 38 are thereby rendered non conducting. The plate of the tube 20 starts a positive excursion at a rate exactly proportional to the current flow in the conductor 32. During this excursion the grid 30 of the tube 14 is driven only slightly further negative. The positive excursion of the plate 20 carries the cathode of the cathode follower tube 24 positive and at a definite positive potential supplied to the sweep gating control circuit 40 from the cathode of the cathode follower tube 26 through the conductor 44, the multivibrator of the sweep gating control circuit 40 is reverted to again render diode 38 conducting. The potential of the grid 30 then becomes slightly less negative to cause the potential of the plate 20 to be rapidly driven in a negative direction until the diode 36 again becomes conducting. The circuit is again in condition for another sweep voltage pulse. Since the sweep rate will be substantially directly proportional to the current in the conductor 32, the sweep rate can be adjusted by varying such current and can be made linear for any given adjustment by maintaining such current constant.

The current control circuit 10 of FIG. 1 provides an adjustable current in the conductor 32, which current can be varied both continuously and in steps involving definite multiplying factors. Such current is substantially constant for any given adjustment. The control circuit includes an adjustable resistor 46 having one end connected to a conductor 47 in turn connected to a source of regulated negative potential supplied by the power supply 18 and its other end connected to a common conductor 48. A plurality of fixed resistors 50, 52, 54, 56, 58 and 60 also each have one end connected to the common conductor 48 and their other ends connected to fixed contacts on a switch 61 which may be of any suitable type, such as a rotary switch. The switch 61 has a movable shorting contact 62 and a movable circuit completing contact 64. It will be apparent that actuation of the switch will cause the shorting contact 62 to connect such other ends of all of the fixed resistors 50 to 60, inclusive, together except the end of the one resistor which has its fixed contact engaged by the movable contact 64. The conductor 32 is connected to the movable contact 64 such that any one of the resistors 50, 52, 54, 56, 58 and 60 can be connected by the switch 61 in series with the conductor 32, while the remaining ones of such resistors are connected to the shorting contact 62.

The movable shorting contact 62 is connected by a conductor 66 to a regulated source of potential shown as including a transistor 68 of the NPN type having a grounded collector and having its base held at a negative potential by being connected to an intermediate point of a voltage divider circuit made up of resistors 70 and 72 connected between ground and the source of regulated negative potential supplied by the power supply 18. The conductor 66 is connected to the emitter and it will be apparent that the potential on the emitter of the transistor 68 will be held substantially constant at a negative value determined by the ratio of the values of the resistors 70 and 72, which negative value may be very closely the same as that of the grid 30 of the tube 14. The potential of the shorting contact 62 of the switch 61 may be thus held substantially the same as that of the control grid of the tube 14, for example, minus 2.1 volts.

A calibrating resistor 74 in series with a fixed resistor 76 is connected between the common conductor 48 and the conductor 66 for calibrating the current control circuit as described below.

For purposes of explaining the operation of the current control circuit of FIG. 1, it will be assumed that the potential of the movable contact 64 of the switch 61 is maintained exactly the same as the potential of the shorting contact 62. This means that the voltage across the current control circuit, i.e., between the conductor 47 and the conductor 32, is the same as that between the conductor 47 and the conductor 66 and this further means that the current through any one of the fixed resistors 50, 52, 54, 56, 58 and 60 remains constant for any given setting of the adjustable resistor 46 no matter what the position of the switch 61. For example, if the adjustable resistor 46 were set so that the current through the resistor 50 is 1 milliampere, the current through the resistor 52 could be made .1 milliampere by making the value of resistance of the resistor 52 ten times that of the resistor 50. If the adjustable resistor 46 is changed so that the current through the resistor 50 is 1.5 milliampere, then the current through the resistor 52 would be .15 milliampere. That is to say, the ratio of the current through the resistor 52 to that through the resistor 50 remains constant no matter what the setting of the adjustable resistor 46. At the same time, the currents through the various fixed resistors may be continuously varied by changing the setting of the adjustable resistor 46. Current flowing through the conductor 32 for any given position of the switch 61 may thus be varied by changing the setting of the adjustable resistor 46 and then for a given setting of such adjustable resistor, the current flowing through the conductor 32 may be changed by any desired multiplying factor, such as multiplying factor of one-tenth just discussed. The calibration resistor 74 may be adjusted to bring the current in any selected one of the fixed resistors to a desired value for a given setting of the adjustable resistor 46. This also results in a definite value of current through the adjustable resistor 46 as indicated by the milliammeter or a definite value of voltage across such adjustable resistor as indicated by the voltmeter 80 for any given setting of the adjustable resistor 46 so that the reading of either such meters may be employed for calibration.

As stated above, the transistor 68 maintains the conductor 66 very closely at a constant negative potential with respect to ground but in the circuit shown, the control grid 30 of the integrator tube 14 does make a slight negative excursion while the plate of such tube is making a positive excursion to produce a sweep voltage. This means that the potential of the conductor 32 goes slightly negative with respect to the conductor 66 during a positive excursion of the plate 20 of the tube 14. This slightly disturbs the condition described above for constant ratios of the current between the fixed resistors 50, 52, 54, 56, 58 and 60, although the effect is so slight as to be negligible for most purposes.

Figure 2:
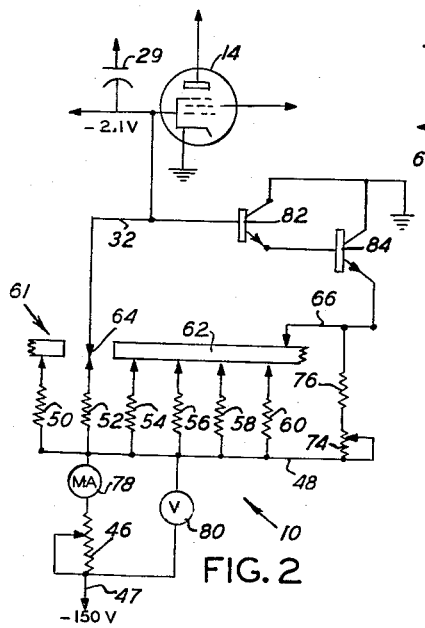
FIG. 2 is a view similar to FIG. 1, showing a modified current control circuit.

A circuit which maintains the constant ratio of currents referred to and overcomes even the slight disturbance mentioned above is shown in FIG. 2. In such circuit the integrator tube 14 and the capacitor 29 may be the same as the elements shown in FIG. 1 and may be connected in the same type of integrator circuit, the other components of which are not shown in FIG. 2. Also, the values of the resistors associated with the switch 61 and the adjustable resistor of the current control circuit 10 may be the same as that of FIG. 1 and have been given the same reference characters. Instead of employing a transistor 68 for holding the potential of the conductor 66 substantially constant with respect to ground, a pair of transistors 82 and 84 of the NPN type connected in cascade as emitter followers are employed for maintaining the potential of the conductor 66 substantially that of the conductor 32. The transistor 82 is of a low current type such that there is very little current flow in its base circuit, whereas the transistor 84 is of a type in which there is substantial current flow in the emitter circuit. For example, the base current of the transistor 82 may be of the order of 1 microampere so as to have negligible effect on the current control circuit 10. The result is that the potential of the conductor 66 is maintained substantially the same as that of the conductor 32. That is to say, the potential of the conductor 66 goes slightly negative along with the conductor 32 but the ratios of the currents in the various resistors 50, 52, 54, 56, 58 and 60 remain very closely constant. Otherwise the circuit shown in FIG. 2 is the same as that shown in FIG. 1.

Figure 3:
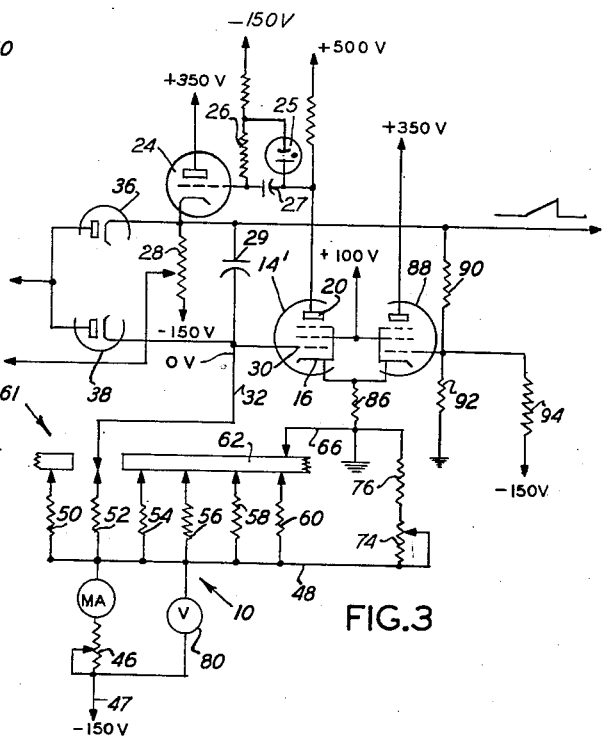
FIG. 3 is a view similar to FIG. 1, showing a further modified current control circuit.

The circuit shown in FIG. 3 also maintains a constant ratio of the current in the resistors 50 to 60 inclusive, and this is accomplished by maintaining the conductors 32 and 66 both at ground potential, the conductor 66 being connected directly to ground. The connections of the integrator tube 14' have been modified to include a cathode load resistor 86 in the cathode circuit thereof. Such resistor is common to the cathode circuit of a tube 88 which is thus cathode coupled to the integrator tube 14' to control the potential of the cathode of such tube. The tube 88 is part of a positive feedback circuit and has its control grid connected to an intermediate point in a voltage divider circuit including resistors 90 and 92 connected between the cathode of cathode follower tube 24 and ground and also a resistor 94 connected between such intermediate point and a source of regulated negative potential. By suitable choice of resistance values for the resistors 90, 92 and 94, the grid of the tube 88 may be maintained at a desired low positive potential with respect to ground when the plate 20 of the integrator tube is at its lowest positive potential and the diodes 36 and 38 are conducting. Such potential may, for example, be such as to make the cathodes of the tubes 14' and 88 at approximately 2.1 volts positive with respect to ground. The potential applied to the plates of the gating diodes 36 and 38 from the sweep gating control circuit when such diodes are conducting is such as to maintain the control grid of the tube 14' at zero potential with respect to ground. This means that the conductors 32 and 66 are at such zero potential when the gating tubes 36 and 38 are conducting. Upon the application of a high negative potential to the plates of the gating tubes 36 and 38 as described with respect to FIG. 1, capacitor 29 starts to charge through the conductor 32 from the negative source of potential through the current control circuit 10. The plate 20 of tube 14' starts its positive excursion and a small portion of this positive excursion is applied to the control grid of tube 88 through the cathode follower tube 24 and the voltage divider circuit including the resistors 90 and 92. This causes the cathode of the tube 88 to carry the cathode 16 of the integrator tube 14' in a positive direction. If the values of resistance of the resistors 86, 90, 92 and 94 are correctly chosen, the cathodes of the tubes 14' and 86 make a slight excursion in a positive direction during generation of the sweep voltage such that the control grid of the tube 14' remains substantially at zero potential. This means that conductor 32 remains at substantially ground potential. Since the conductor 66 is connected to ground, the potential across all portions of the current control circuit 10 remains substantially constant and the ratios of the currents in the various resistors 50 to 60 remain constant for any setting of the adjustable resistor 46 no matter what the position of the switch 61.

Figure 4:
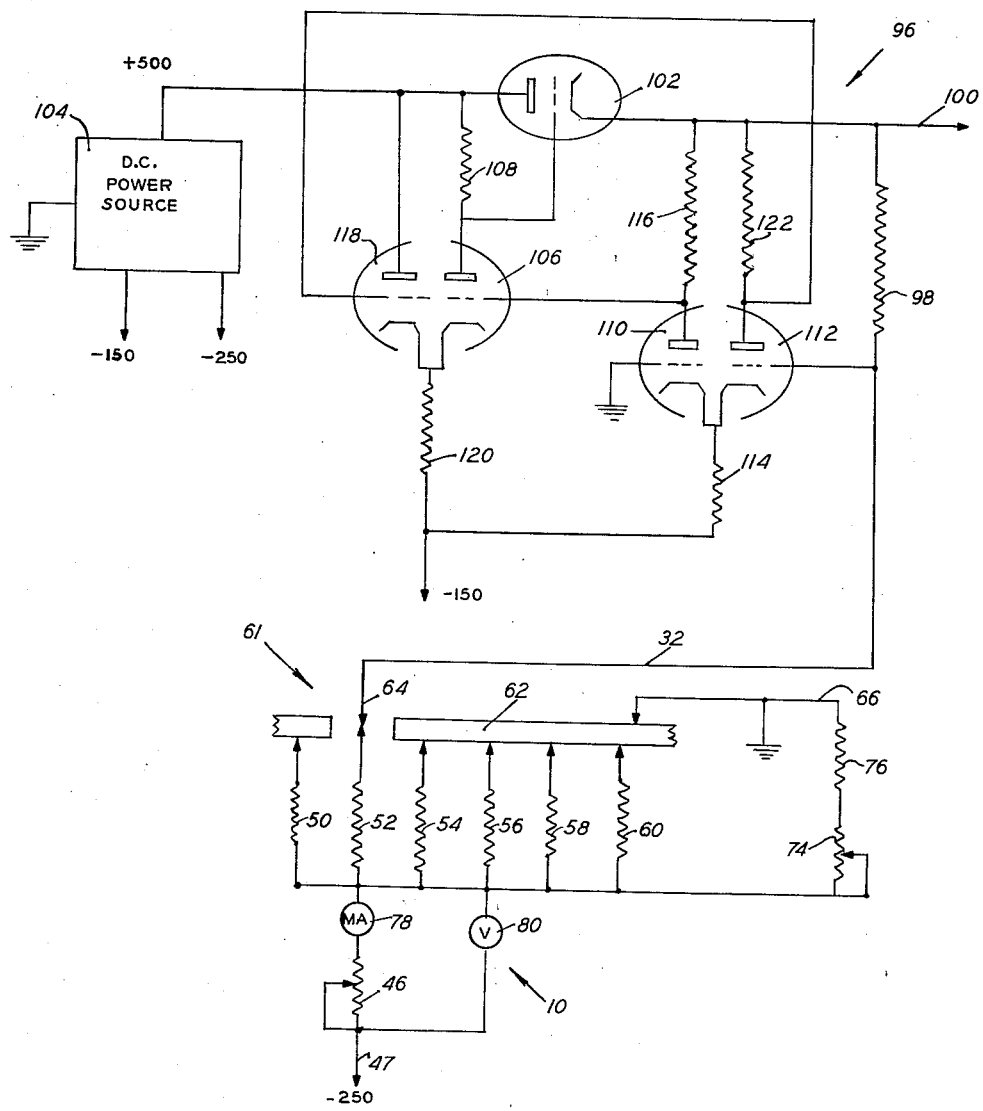
FIG. 4 is a schematic diagram showing a still further modified current control circuit employed to provide a regulated variable output voltage.

FIG. 4 illustrates how the current control circuit of the present invention may be employed to supply a regulated output voltage variable between wide limits. The current control circuit 10 is the same as that of FIGS. 1 to 3 and has the same reference numerals applied thereto. The conductor 66 is connected to ground and the conductor 32 is maintained at ground potential by the regulated voltage circuit 96. The current flowing through conductor 32 thus remains constant for any setting of the potentiometer 46 or switch 61 and this means that the current flowing through the resistor 98 is entirely controlled by the control circuit 10. Any voltage regulator circuit which will maintain the conductor 32 at ground potential even though current flow through resistor 98 varies widely will provide an output voltage at 100 which is proportional to current flow through the resistor 98, which current flow is controlled by the current control circuit.

The regulated voltage circuit shown may contain a series voltage regulator triode 102 having its plate connected to an unregulated source of positive potential from a D.C. power source 104 and its cathode connected to the output terminal 100. The grid of the tube 102 is connected to the plate of an amplifier tube 106, which plate is also connected to the source of positive potential through a load resistor 108. The grid of the amplifier tube 106 is connected to the plate of a tube 110 which has its grid connected to ground and which forms part of a voltage comparison circuit also including a tube 112 which has its grid connected to the conductor 32. The cathodes of the tubes 110 and 112 are connected together and to a regulated source of negative potential through a cathode load resistor 114. The cathodes of the tubes 110 and 112 therefor tend to follow the grid of the tube 112. The plate of the tube 110 is connected to the source of regulated positive potential from the tube 102 through a load resistor 116 and any variation of the grid of the tube 112 from ground potential therefore causes the plate of the tube 110 to vary in potential in the same direction and such variation is applied to the grid of the amplifier tube 106. This causes the plate of the amplifier tube 106 to vary in potential at a greater rate and in the opposite direction from that of the grid of the tube 112 to cause the potential of the cathode of the tube 102 to vary in such opposite direction at such greater rate. A portion of the variation of the potential of the cathode of the tube 102 is applied through the resistor 98 to the grid of the tube 112 to return it and the conductor 32 toward ground potential.

This action is assisted by the plate circuit of the tube 112 and by the tube 118 which is cathode coupled to the tube 106 through the common cathode load resistor 120 and which has its plate connected to the source of positive potential and its grid connected to the plate of the tube 112. The plate of the tube 112 is connected through a load resistor 122 to the regulated positive potential from the tube 102. The plate of the tube 112 varies in potential oppositely from that of the grid of such tube and this variation in potential is applied to the grid of the tube 118. The potential of the cathodes of the tubes 118 and 106 are thus driven in a direction opposite to that of the grid of the tube 106 to also assist in causing the potential of the plate of the tube 106 to vary in the opposite direction from the potential of the grid of the tube 112.

Thus, if for any reason the potential of the conductor 32 moves in a positive direction from ground potential, the potential of the grid of tube 112 becomes positive with respect to ground and the cathode of such tube as well as that of the cathode of tube 110 follows in a positive direction. This causes the potential of the plate of the tube 110 to be driven in a positive direction and this more positive potential is applied to the grid of the tube 106 to cause the potential of the plate of such tube to vary in a negative direction. The resulting more negative potential is supplied to the grid of the tube 102 to carry its cathode in a negative direction. A portion of this more negative potential is applied to the conductor 32 and grid of the tube 112 to return their potential toward ground potential.

When the potential of the grid of the tube 112 moves in a positive direction to ground, the plate of such tube becomes more negative in potential and this negative potential variation is applied to the grid of the tube 118. The cathodes of the tubes 118 and 106 follow this negative potential to assist in driving the plate of the tube 106 in a negative direction to in turn drive the cathode of the tube 106 in a negative direction and assist in returning the conductor 32 to ground potential. As long as conductor 32 is maintained at ground potential, the potential at the output terminal 100 is directly proportional to the current flowing through the resistor 98 and this current is entirely controlled by the current control circuit 10. It is apparent that the potential selected for the conductors 32 and 66 can be other than ground potential, as long as both conductors are maintained at the same potential without current flow directly between such conductors.

From the above description of the circuits of the various figures, it will be apparent that circuit of FIG. 1 maintains both the conductors 32 and 66 at small negative potentials with respect to ground, which potentials are constant and equal to each other within a very small fraction of one volt so that the voltages across all portions of the current control circuit 10 remain substantially constant. This is accomplished while preventing any actual current flow directly between such conductors. The potential of the conductor 32 does very slightly with respect to the potential on the conductor 66, however, so that there is a very slight variation of the current ratios in the various resistors 50 to 60. The circuit of FIG. 2 maintains such current ratios almost exactly constant by maintaining a small negative potential upon the conductor 66 which varies with and remains equal to the potential on the conductor 32 without current flow directly between such conductors. Again the potentials across all portions of the current control circuit 10 remains substantially constant. In the circuit of FIGS. 3 and 4, the conductors 32 and 66 are maintained at ground potential such that the potential across all branches of the current control circuit 10 remains constant. Thus in all three circuits the potentials across the control circuit including the adjustable resistor 46 and the various fixed resistors 50, 52, 54, 56, 58 and 60 remain substantially constant no matter what the setting of the adjustable resistor 46 or the position of the switch 61 without substantial current flow between the conductors.

In a practical circuit for a sweep generator, the maximum current through the resistor 50 may, for example, be 1.5 milliamperes. Thus the resistor 50 may have a resistance of, for example, 100,000 ohms so that such current will flow therethrough when resistor 46 is adjusted for zero resistance, assuming that the voltage across the current control circuit is 150 volts. The resistors 52, 54, 56, 58 and 60 may each have a higher resistance. For example, each resistor may have a resistance which is ten times that of the next preceding resistor. Under the conditions just described, the current in the resistor 52 would be .15 milliampere, the current in the resistor 54 would be .015 milliampere, etc. Actuation of the switch to move the contact 64 to the right in the figures will reduce the current in the conductor 32 by the factor of one tenth for each step of the switch and conversely movement of such contact 64 to the left in the figures will multiply the current in the conductor 32 by the factor 10. This is true for any setting of the adjustable resistor 46.

The multiplying factor, of course, need not be 10 but may be any other desired factor, such as 2 or $\sqrt{10}$. If R is the total parallel resistance of the resistors 50 to 60 inclusive, $r$ is the resistance of the resistor 50 and M is the multiplying factor discussed above, then the total parallel resistance R can never be less than $$r\left(1 - \frac{1}{M}\right)$$

no matter how many resistors are employed. This means that the total current through the resistors 50 to 60 inclusive, will never exceed $$\frac{M}{M-1}$$

times the current flowing through the resistor 50. If the multiplying factor M is 10, then the total current flowing through all of the resistors 50 to 60, inclusive, is never greater than 1.11 times the current in the resistor 50. Even for a multiplying factor of 2, the total current will never exceed twice the current in the resistor 50 and for a larger multiplying factor M, the total current through the resistors 50 to 60 would be even less than that given. While, a common multiplying factor between the various resistors 50 to 60 has been discussed above, it is, of course, entirely apparent that resistors 50 to 60, inclusive, may have any desired values within the current limitations of the circuit and need not have a common multiplying factor as discussed above. Also they need not be resistors but, for certain purposes, may be impedance branches containing capacitance or inductance so long as they are similar in properties so as to each contain the same ratios of such impedances. The adjustable resistor 46 may, for example, have a value which will vary the current through the resistors 50 to 60 inclusive, over a range of 1 to 10 or greater. For example, such resistor may be variable between zero and 250,000 ohms in the circuit above described where the resistor 50 has a value of 100,000 ohms.

The current indicated by the milliammeter 78 of FIGURES 1 to 3 is proportional to the current through any resistor 50 to 60, inclusive, and in the circuit shown is proportional to the sweep velocity, i.e., the change in sweep voltage, and such meter can be calibrated directly in sweep velocity with a linear scale or scales. The voltage indicated by the voltmeter 80 in such figures varies with sweep time and such meter can be calibrated in sweep time. By using inverse scales on such meters the milliampere meter may be calibrated in sweep time and the voltmeter in sweep velocity. Similarly either of the two meters of FIG. 4 can be calibrated in output voltage. It will be understood that the meters 78 and 80 are not necessary for the operations of the various circuits. For example, the resistor 46 may be a precision potentiometer calibrated in any desired units, such as sweep time or sweep velocity in FIGS. 1 to 3 and output voltage in FIG. 4.

While I have disclosed the preferred embodiment of my invention, it is to be understood that the details may be varied and that the scope of the invention is to be determined by the following claims.

I claim:
1. A current control circuit comprising a plurality of impedance branches having different value of impedance, an adjustable impedance having one end connected to one end of each of said impedance branches, a controlled circuit, means for connecting a selected one of said impedance branches and said adjustable impedance in series with said controlled circuit and with a source of electric potential, and means for maintaining the potentials at the other end of said one impedance branch and the other ends of said remaining impedance branches substantially the same while preventing substantial current flow between said other end of said one impedance branch and said other ends of said remaining impedance branches.

2. A current control circuit comprising a plurality of impedance branches having different value of impedance, an adjustable impedance having one end connected to one end of each of said impedance branches, a controlled circuit, means for connecting a selected one of said impedance branches and said adjustable impedance in series with said controlled circuit and with a source of electric potential, and means for maintaining the potentials at the other end of said one impedance branch and the other ends of said remaining impedance branches substantially constant while preventing substantial current flow between said other end of said one impedance branch and said other ends of said remaining impedance branches.

3. A current control circuit comprising a plurality of resistance branches having different value of resistance, an adjustable resistor having one end connected to one end of each of said resistance branches, a controlled circuit, means for connecting a selected one of said resistance branches and said adjustable resistance in series with said controlled circuit and with a source of electric potential and for connecting the other ends of the remaining ones of said resistance branches together, and means for maintaining the potentials at the other end of said one resistance branch and said other ends of said remaining resistance branches substantially the same while preventing substantial current flow between said other end of said one resistance branch and said other ends of said remaining resistance branches.

4. A current control circuit comprising a plurality of similar impedance branches each connected at one end to a common conductor, an adjustable impedance having one end connected to said common conductor and its other end connected to a first conductor, means for selectively connecting the other end of one of said similar impedance branches to a second conductor and connecting the other ends of the remainder of said similar impedance branches simultaneously to a third conductor, a controlled circuit and a voltage source connected in series between said first and second conductors, and means maintaining said second and third conductors at substantially the same potential while preventing substantial current flow between said second and third conductors.

5. A current control circuit comprising a plurality of similar impedance branches each connected at one end to a common conductor, an adjustable impedance having one end connected to said common conductor and its other end connected to a first conductor, means for selectively connecting the other end of one of said similar impedance branches to a second conductor and connecting the other ends of the remainder of said similar impedance branches simultaneously to a third conductor, a controlled circuit and a regulated voltage source connected in series between said first and second conductors, and means maintaining said second and third conductors at substantially a constant potential while preventing substantial current flow between said second and third conductors.

6. A current control circuit comprising a plurality of resistance branches each connected at one end to a common conductor and differing from each other by a constant multiplying factor, an adjustable resistance having one end connected to said common conductor and its other end connected to a first conductor, means for selectively connecting the other end of one of said resistance branches to a second conductor and connecting the other ends of the remainder of said resistance branches simultaneously to a third conductor, a controlled circuit and a regulated voltage source connected in series between said first and second conductors, and means maintaining said second and third conductors at substantially the same potential while preventing substantial current flow between said second and third conductors.

7. A current control circuit comprising a plurality of impedance branches having different value of impedance, an adjustable impedance having one end connected to one end of each of said impedance branches, a controlled circuit, means for connecting a selected one of said impedance branches and said adjustable impedance in series with said controlled circuit and with a source of electric potential, and means maintaining the potential across all of said impedance branches substantially the same while preventing substantial current flow between the other end of said one impedance branch and the other ends of said remaining impedance branches.

8. A current control circuit comprising a plurality of impedance branches having different value of impedance, an adjustable impedance having one end connected to one end of each of said impedance branches, a controlled circuit, means for connecting a selected one of said impedance branches and said adjustable impedance in series with said controlled circuit and with a source of electric potential and for connecting the other ends of the remaining ones of said impedance branches together, and means maintaining the potential across all of said impedance branches substantially the same while preventing substantial current flow between the other end of said one impedance branch and said other ends of said remaining impedance branches.

9. A current control circuit comprising a plurality of resistance branches having different value of resistance, an adjustable resistance having one end connected to one end of each of said resistance branches, a controlled circuit, means for connecting a selected one of said resistance branches and said adjustable resistance in series with said controlled circuit and with a source of electric potential, and means maintaining the potential across all of said resistance branches substantially the same while preventing substantial current flow between the other end of said one resistance branch and the other ends of said remaining resistance branches.

10. A current control circuit comprising a plurality of impedance branches having different value of impedance, one end of all of said impedance branches being connected together, a controlled circuit, means for connecting a selected one of said impedance branches in series with said controlled circuit and with a source of electric potential, and means for maintaining the potentials at the other end of said one impedance branch and the other ends of said remaining impedance branches substantially the same while preventing substantial current flow between said other end of said one impedance branch and said other ends of said remaining impedance branches.

11. A current control circuit comprising a plurality of impedance branches having different value of impedance, one end of all of said impedance branches being connected together, a controlled circuit, means for connecting a selected one of said impedance branches in series with said controlled circuit and with a source of electric potential, and means for maintaining the potentials at the other end of said one impedance branch and said other ends of said remaining impedance branches substantially the same while preventing substantial current flow between said other end of said one impedance branch and said other ends of said remaining impedance branches, an impedance in said controlled circuit, said control circuit being the sole source of current supply for said impendance so that the voltage across said impedance is determined by the current from said current control circuit.

12. A current control circuit comprising a plurality of resistance branches having different value of resistance, an adjustable resistance having one end connected to one end of each of said resistance branches, a controlled circuit, means for connecting a selected one of said resistance branches and said adjustable resistance in series with said controlled circuit and with a source of electric potential, and means maintaining the potential across all of said resistance branches substantially the same while preventing substantial current flow between the other end of said one resistance branch and the other ends of said remaining resistance branches, a resistance in said controlled circuit, said control circuit being the sole source of current flowing through said resistance so that the voltage across said resistance is determined by the current from said current control circuit.

No references cited.